United States Patent
Hidaka (10) Patent No.: US 10,873,246 B2
(45) Date of Patent: Dec. 22, 2020

(54) DRIVING UNIT

(71) Applicant: HONDA MOTOR CO., LTD., Tokyo (JP)

(72) Inventor: Yuichi Hidaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/507,110

(22) Filed: Jul. 10, 2019

(65) Prior Publication Data

US 2020/0021171 A1    Jan. 16, 2020

(30) Foreign Application Priority Data

Jul. 13, 2018   (JP) .................... 2018-133565

(51) Int. Cl.
| | |
|---|---|
| *H02K 9/22* | (2006.01) |
| *H02K 11/00* | (2016.01) |
| *H02K 11/33* | (2016.01) |
| *H02K 5/12* | (2006.01) |
| *B60K 6/26* | (2007.10) |

(52) U.S. Cl.
CPC .............. *H02K 9/22* (2013.01); *B60K 6/26* (2013.01); *H02K 5/12* (2013.01); *H02K 11/33* (2016.01)

(58) Field of Classification Search
CPC . H02K 9/22; H02K 11/33; H02K 5/12; B60K 6/26
USPC .................................. 310/64, 68 D
See application file for complete search history.

(56) References Cited

U.S. PATENT DOCUMENTS

2005/0253465 A1*  11/2005  Takenaka .............. H02K 5/20
                                                              310/52

FOREIGN PATENT DOCUMENTS

JP      2015-107030        6/2015
JP      2015107030  A  *   6/2015

OTHER PUBLICATIONS

Machine Translation, Suzuki, JP-2015107030-A, Jun. 2015. (Year: 2015).*

* cited by examiner

*Primary Examiner* — Thomas Truong
(74) *Attorney, Agent, or Firm* — Amin, Turocy & Watson, LLP (57) ABSTRACT

A driving unit includes a motor, a control unit and a partition member. The control unit includes an inverter configured to transfer electric power to and/or from the motor, and a casing configured to accommodate the inverter. The partition member is disposed between the motor and the inverter. The partition member includes a first heat conductive member, and a second heat conductive member disposed at a first side of the first heat conductive member in a thickness direction and having a thermal conductivity lower than that of the first heat conductive member and a third heat conductive member disposed at a second side of the first heat conductive member in the thickness direction of the first heat conductive member and having a thermal conductivity lower than that of the first heat conductive member. The heat conductive member is coupled to the casing.

6 Claims, 8 Drawing Sheets

DRIVING UNIT

CROSS-REFERENCE TO RELATED APPLICATION

Priority is claimed on Japanese Patent Application No. 2018-133565, filed Jul. 13, 2018, the content of which is incorporated herein by reference.

BACKGROUND OF THE INVENTION

Field of the Invention

The present invention relates to a driving unit.

Description of Related Art

In the related art, a driving device in which a first housing configured to accommodate a motor and a second housing configured to accommodate a power converter connected to the motor are integrated is known (for example, see Japanese Unexamined Patent Application, First Publication No. 2015-107030). In such a driving device, a configuration in which heat transfer between the motor and the power converter can be minimized and temperature management of each of the motor and the power converter can be independently performed by disposing a latent heat storage material between a protrusion section of a first housing and a protrusion section of a second housing is provided.

SUMMARY OF THE INVENTION

Incidentally, in the above-mentioned driving device, since the latent heat storage material is accommodated between the protrusion section of the first housing and the protrusion section of the second housing, the configuration is complicated. In the above-mentioned integrated driving device, it is desired to minimize heat transfer between the motor and the power converter in a member configured to partition an internal space of the first housing from an internal space of the second housing using a simple configuration.

An aspect of the present invention is directed to providing a driving unit capable of minimizing heat transfer between a motor and an inverter while minimizing complication of a configuration in which the motor and the inverter are integrated.

The present invention employs the following aspects.

(1) A driving unit according to an aspect of the present invention includes a motor; an inverter configured to transfer electric power to and/or from the motor; a casing configured to accommodate the motor and the inverter; and a partition member disposed between the motor and the inverter, wherein the partition member comprises a first heat conductive member, a second heat conductive member disposed at a first side of the first heat conductive member in a thickness direction of the first heat conductive member and having a thermal conductivity lower than that of the first heat conductive member, and a third heat conductive member disposed at a second side of the first heat conductive member in the thickness direction of the first heat conductive member and having a thermal conductivity lower than that of the first heat conductive member, and the first heat conductive member is coupled to at least one of a part of the casing closer to the accommodated inverter and a heat sink.

(2) In the driving unit according to the above-mentioned (1), a part of the first heat conductive member may be exposed from the second heat conductive member, and may come in contact with at least one of the part of the casing closer to the accommodated inverter and the heat sink.

(3) In the driving unit according to the above-mentioned (1) or (2), a part of the casing closer to the accommodated motor and the part of the casing closer to the accommodated inverter may be coupled via a sealing member having a thermal conductivity lower than that of the casing.

(4) In the driving unit according to any one of the above-mentioned (1) to (3), the partition member may constitute a cover of the inverter.

(5) In the driving unit according to any one of the above-mentioned (1) to (5), an external form of the partition member may be formed in a shape having a concave section or a flat plate shape.

(6) In the driving unit according to any one of the above-mentioned (1) to (5), among the second heat conductive member and the third heat conductive member, the one disposed closer to the motor may have a larger thickness.

According to the above-mentioned (1), heat transfer between the motor and the inverter can be minimized by the second heat conductive member and the third heat conductive member having a thermal conductivity lower than that of the first heat conductive member. The second heat conductive member can minimize heat transfer of the ambient temperature on the side of the motor having a relatively high temperature toward the inverter. In addition, since the first heat conductive member is coupled to at least one of a part of the casing closer to the accommodated inverter and the heat sink, heat transmitted to the first heat conductive member promotes radiation of heat to the part of the casing closer to the accommodated inverter and the heat sink. Accordingly, an increase in ambient temperature on the side of the inverter by the ambient temperature on the side of the motor can be minimized.

In the case of the above-mentioned (2), heat conduction between the first heat conductive member and the part of the casing closer to the accommodated inverter or the heat sink can be promoted and radiation of heat transferred to the first heat conductive member can be accelerated.

In the case of the above-mentioned (3), heat transfer between the part of the casing closer to the accommodated motor and the part of the casing closer to the accommodated inverter can be minimized.

In the case of the above-mentioned (4), mixing of foreign substances such as oil or the like from the side of the motor toward the inverter can be minimized.

In the case of the above-mentioned (5), versatility related to a shape of the partition member can be improved.

In the case of the above-mentioned (6), the second heat conductive member on the side of the motor can minimize an increase in ambient temperature on the side of the inverter due to the ambient temperature on the side of the motor that is a relatively high temperature.

DETAILED DESCRIPTION OF THE INVENTION

Hereinafter, an embodiment of a driving unit of the present invention will be described with reference to the accompanying drawings.

Figure 1:
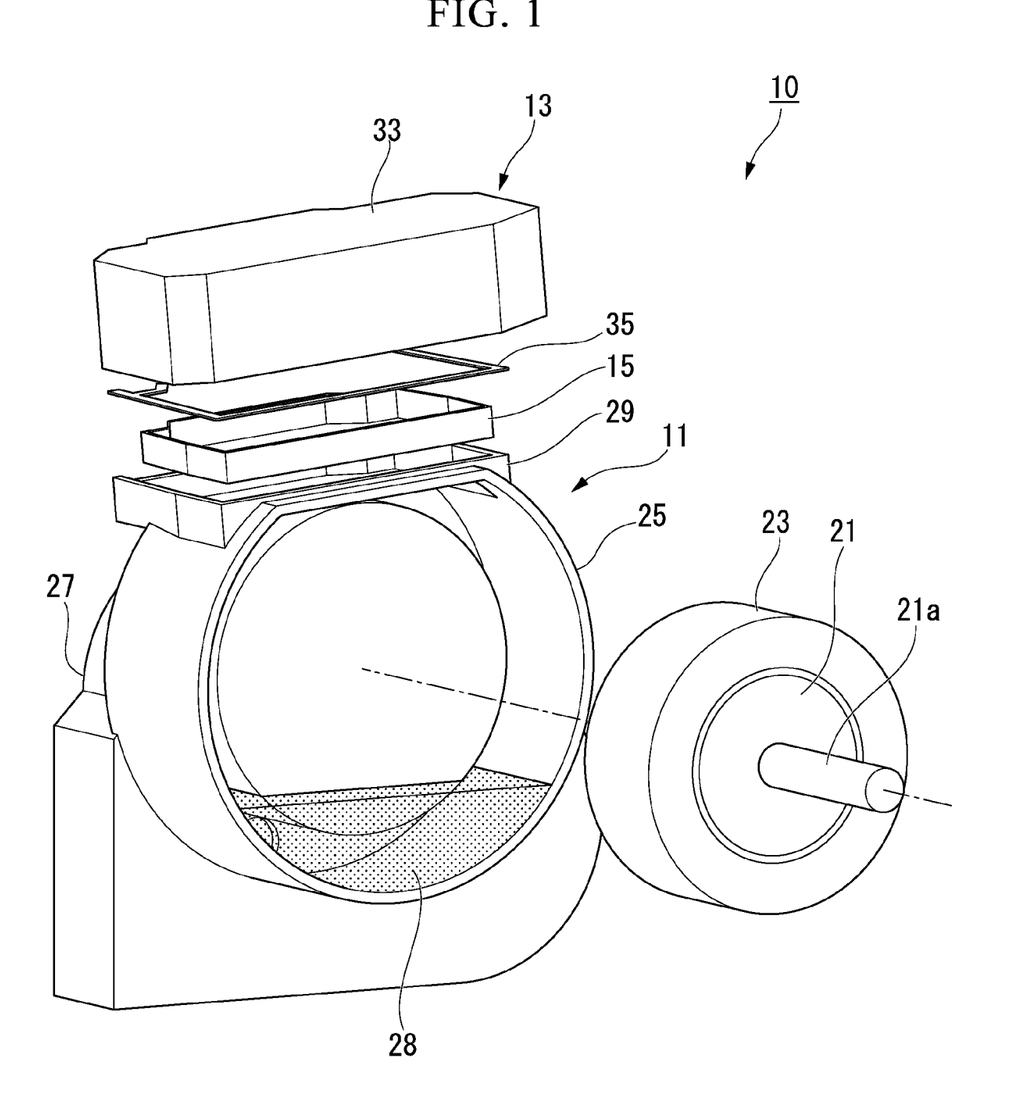
FIG. 1 is an exploded perspective view showing a configuration of a driving unit according to an embodiment of the present invention.
Figure 2:
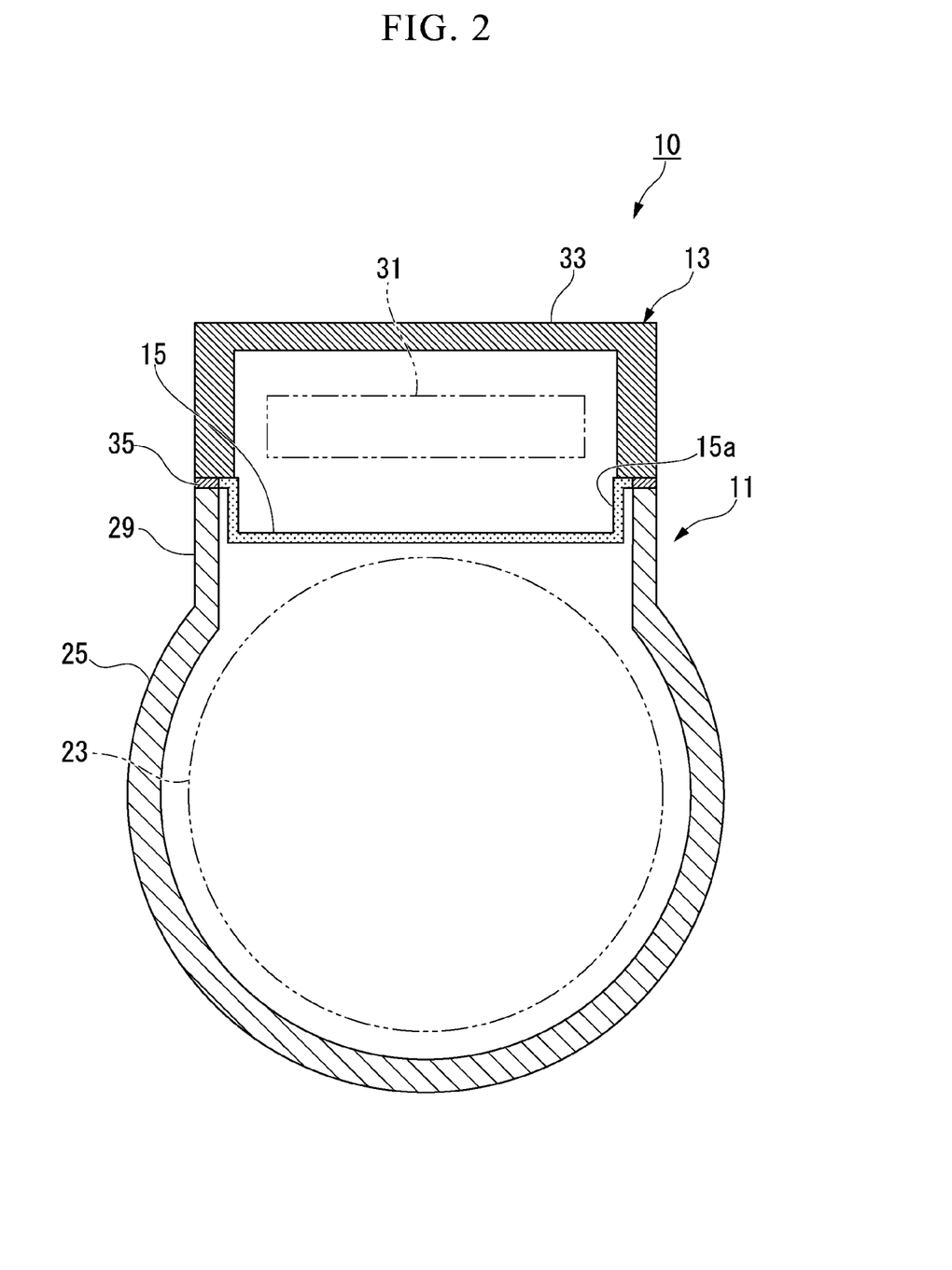
FIG. 2 is a cross-sectional view showing the configuration of the driving unit according to the embodiment of the present invention.
Figure 3:
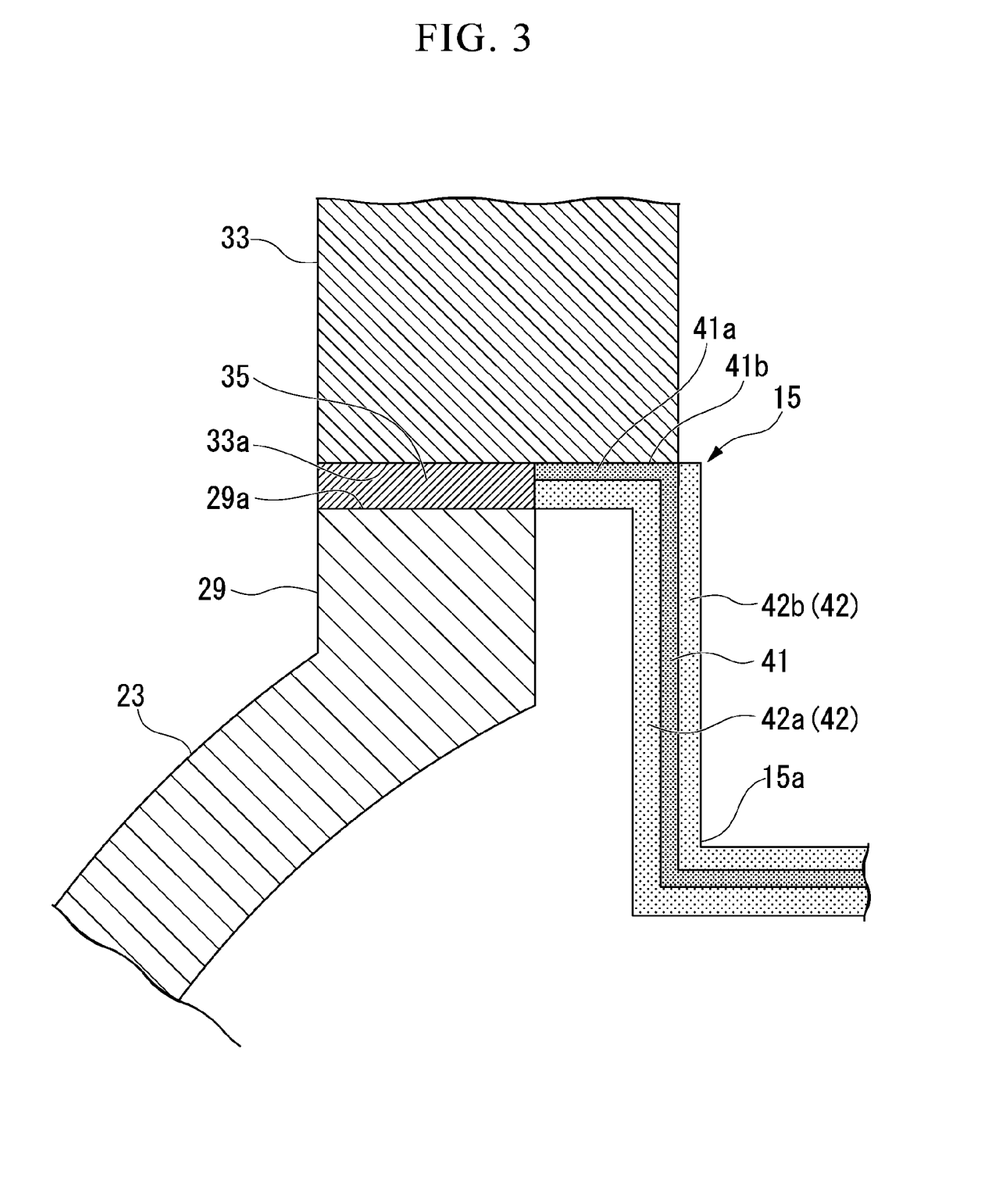
FIG. 3 is an enlarged cross-sectional view showing a part of a partition member of the driving unit according to the embodiment of the present invention.
Figure 4:
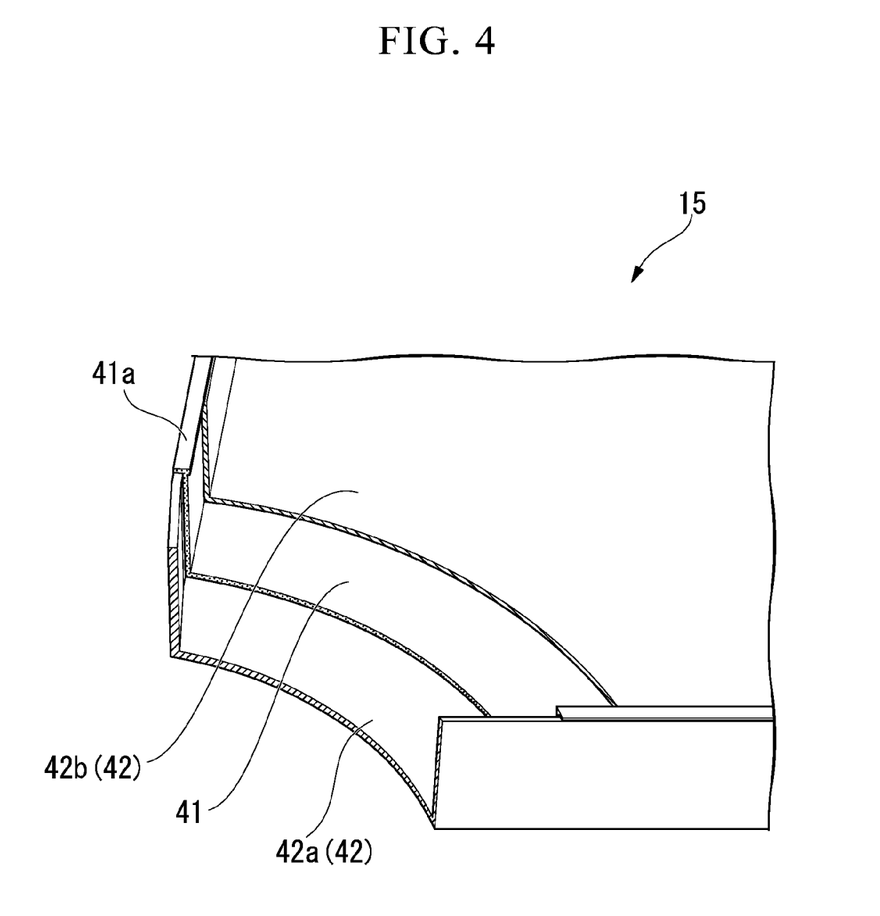
FIG. 4 is a perspective view showing the partition member of the driving unit according to the embodiment of the present invention in which a part thereof has been cut away.

FIG. 1 is an exploded perspective view showing a driving unit 10 according to the embodiment of the present invention. FIG. 2 is a cross-sectional view showing a configuration of the driving unit 10 according to the embodiment of the present invention. FIG. 3 is an enlarged cross-sectional view of a part of a partition member 15 of the driving unit 10 according to the embodiment of the present invention. FIG. 4 is a perspective view showing the partition member 15 of the driving unit 10 according to the embodiment of the present invention in which a part thereof has been cut away.

The driving unit 10 is mounted on, for example, a vehicle 1. As shown in FIG. 1, the driving unit 10 includes a motor 11, a control unit 13 integrally fixed to the motor 11, and the partition member 15 disposed between the motor 11 and the control unit 13.

The motor 11 is, for example, a 3-phase alternating current brushless DC motor. The three phases are a U phase, a V phase, and a W phase. The motor 11 includes a rotor 21 having a permanent magnet for a field system, a stator 23 having a 3-phase stator winding configured to generate a rotating magnetic field to rotate the rotor 21, and a motor housing 25. For example, the motor 11 is an inner rotor type in which the rotor 21 is disposed inside the stator 23.

The motor 11 is connected to a transmission. The transmission is accommodated in a transmission case 27 fixed to, for example, the motor housing 25. A rotary shaft 21a of the rotor 21 of the motor 11 is connected to the transmission through the transmission case 27.

An external form of the motor housing 25 is formed in, for example, a bottomed cylindrical shape. The motor housing 25 accommodates working oil 28 as a coolant in addition to the rotor 21 and the stator 23. The working oil 28 is distributed in the motor housing 25 together with heat exchange with the rotor 21 and the stator 23 during an operation of the motor 11. Accordingly, an ambient temperature in the motor housing 25 during the operation of the motor 11 is increased.

The motor housing 25 includes a mount stand 29 on which the control unit 13 is disposed. An external form of the mount stand 29 is formed in, for example, a rectangular cylindrical shape. The mount stand 29 is provided on an outer circumferential surface of the motor housing 25.

The control unit 13 includes an inverter 31 configured to transfer electric power to and/or from the motor 11, and a case 33. The inverter 31 is connected to a 3-phase stator winding of the motor 11.

Further, the control unit 13 may include a boosting circuit, a control board, a current sensor, and so on, in addition to the inverter 31.

An external form of the case 33 is formed in, for example, a box shape. The case 33 accommodates the inverter 31. As shown in FIG. 2 and FIG. 3, the motor housing 25 and the case 33 are coupled to each other via, for example, a sealing member 35 having a thermal conductivity lower than that of the motor housing 25 and the case 33.

The sealing member 35 is an adiabatic member such as a paper-made packing or the like. An external form of the sealing member 35 is formed in, for example, a rectangular annular plate shape. The sealing member 35 is disposed between, for example, a tip 29a of the mount stand 29 in the motor housing 25 and an opening end 33a of a circumferential edge of the case 33. The sealing member 35 minimizes direct heat transfer between the motor housing 25 and the case 33.

An external form of the partition member 15 is formed, for example, in a bathtub shape having a concave section 15a recessed toward the motor 11. As shown in FIG. 3 and FIG. 4, the partition member 15 includes a first heat conductive member 41, and a pair of second heat conductive members 42 having a thermal conductivity lower than that of the first heat conductive member 41. The pair of second heat conductive members 42 are laminated on the first heat conductive member 41 so as to interpose the first heat conductive member 41 from both sides in a thickness direction of the first heat conductive member 41. In the pair of second heat conductive members 42, a thickness of a motor-side heat conductive member (the second heat conductive member) 42a disposed on the side of the motor 11 is larger than that of an inverter-side heat conductive member (the third heat conductive member) 42b disposed on the side of the inverter 31.

The first heat conductive member 41 is formed of a metal material such as steel, copper, aluminum, or the like. The second heat conductive members 42 are formed of a resin material such as polyamide or the like. Further, the second heat conductive members 42 may be formed of an adiabatic material.

The partition member 15 is connected to the case 33 of the control unit 13. For example, in a circumferential edge portion of the partition member 15, an end portion 41a of the first heat conductive member 41 exposed from the pair of second heat conductive members 42 comes in direct contact with the opening end 33a of the case 33. The end portion 41a of the first heat conductive member 41 has an exposure section 41b exposed from the second heat conductive members 42 on the side of the case 33 by, for example, cutting out a part of the heat conductive member 42b on the side of the inverter. The first heat conductive member 41 does not expose from the second heat conductive members 42 on the side of the motor housing 25 and does not come in direct contact with the motor housing 25.

Figure 5:
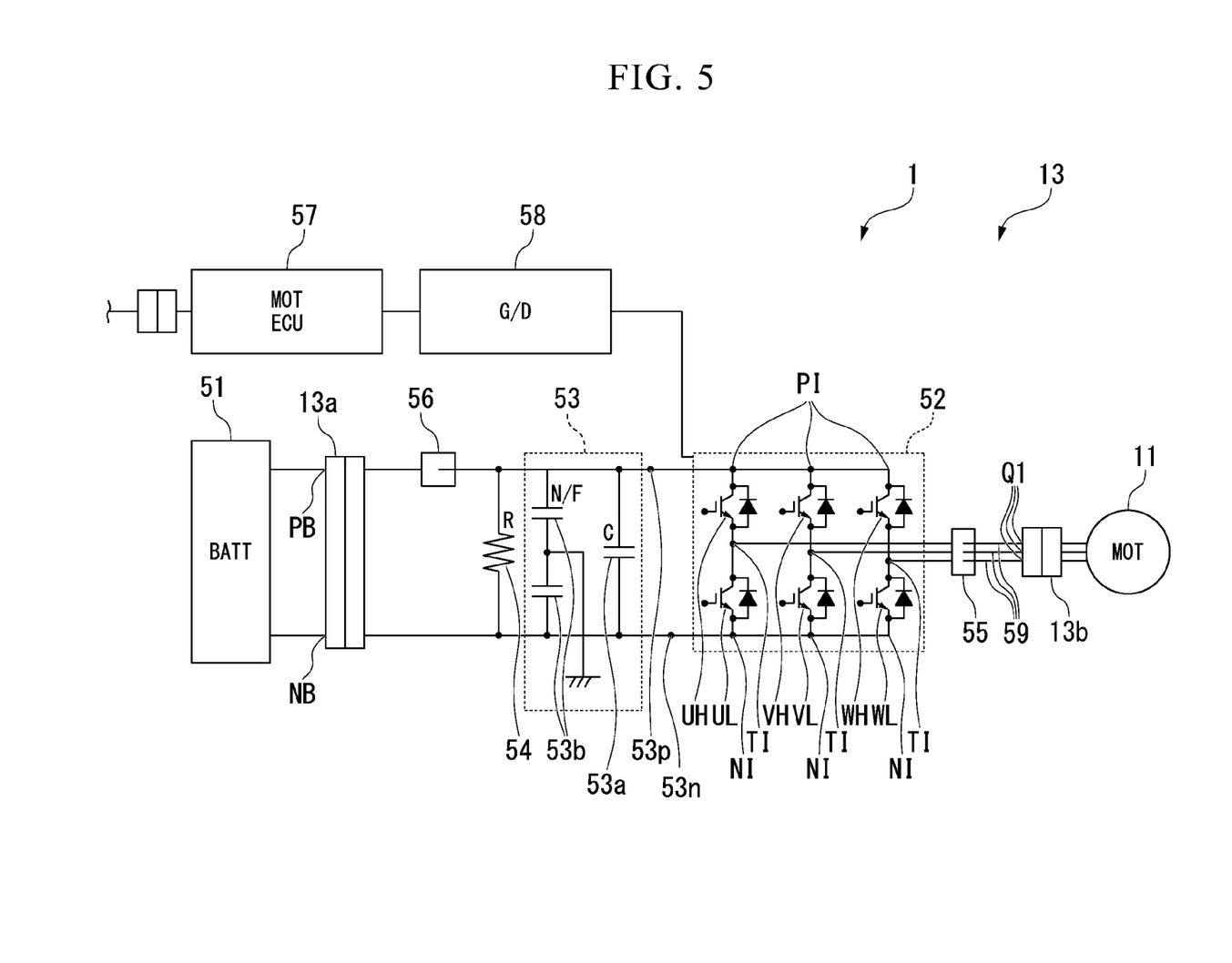
FIG. 5 is a view showing a configuration of a part of a vehicle on which the driving unit of the embodiment of the present invention is mounted.

Hereinafter, an example of the vehicle 1 on which the driving unit 10 of the embodiment is mounted will be described. FIG. 5 is a view showing a configuration of a part of the vehicle 1 on which the driving unit 10 of the embodiment is mounted.

As shown in FIG. 5, the vehicle 1 includes a battery 51 (BATT), the motor 11 (MOT) for traveling driving, and the control unit 13.

The battery 51 is, for example, a high voltage battery that is a power source of the vehicle 1. The battery 51 includes a battery case, and a plurality of battery modules accommodated in the battery case. Each of the battery modules includes a plurality of battery cells connected to each other in series. The battery 51 includes a positive electrode terminal PB and a negative electrode terminal NB connected to a direct current connector 13a of the control unit 13. The positive electrode terminal PB and the negative electrode terminal NB are connected to positive electrode ends and negative electrode ends of a plurality of battery modules connected to each other in series in the battery case.

The motor 11 generates a rotating driving force (a power-run operation) using electric power supplied from the battery 51. The motor 11 may generate a generated output using a rotating driving force input to the rotary shaft. A configuration in which a rotating power of an internal combustion engine is transmittable to the motor 11 may be provided.

The control unit 13 includes a power module 52 and a capacitor unit 53 that constitute the inverter 31, a resistor 54, a first current sensor 55, a second current sensor 56, an electronic control unit 57 (MOT ECU), and a gate drive unit 58 (G/D).

The power module 52 is connected to a 3-phase stator winding of the motor 11 using, for example, a 3-phase connector 13b. The power module 52 converts direct current electric power input from the battery 51 into 3-phase alternating current electric power. The power module 52 may convert 3-phase alternating current electric power input from the motor 11 into direct current electric power. The direct current electric power converted by the power module 52 can be supplied to the battery 51.

The power module 52 includes a bridge circuit constituted by a plurality of switching elements that are bridge-connected to each other. For example, the switching element is a transistor such as an insulated gate bipolar transistor (IGBT), a metal oxide semi-conductor field effect transistor (MOSFET), or the like. For example, in the bridge circuit, high side arm and low side arm U phase transistors UH and UL that form a pair, high side arm and low side arm V phase transistors VH and VL that form a pair, and high side arm and low side arm W phase transistors WH and WL that form a pair are bridge-connected to each other.

The high side arm transistors UH, VH and WH constitute a high side arm when a collector is connected to positive electrode bus bars PI. In each phase, the positive electrode bus bars PI of the high side arm are connected to positive electrode bus bars 53p of the capacitor unit 53.

The low side arm transistors UL, VL and WL constitute a low side arm when an emitter is connected to negative electrode bus bars NI. In each phase, the negative electrode bus bars NI of the low side arm are connected to negative electrode bus bars 53n of the capacitor unit 53.

Further, in connection between the positive electrode bus bars PI and 53p and connection between the negative electrode bus bars NI and 53n, for example, connection or the like due to laser welding or a clip that is smaller than a bolt fastening is employed to minimize thermal damage to an insulating area.

In each phase, the emitter of the high side arm transistors UH, VH and WH is connected to the collector of the low side arm transistors UL, VL and WL at a connecting point TI.

In each phase of the power module 52, an input/output bus bar 59 that forms the connecting point TI is connected to an input/output terminal Q1. The input/output terminal Q1 is connected to the 3-phase connector 13b. The connecting point TI of each phase of the power module 52 is connected to the stator winding of each phase of the motor 11 via the input/output bus bar 59, the input/output terminal Q1 and the 3-phase connector 13b.

The bridge circuit includes diodes connected in a normal direction from the emitter to the collector between the collector and the emitter of the transistors UH, UL, VH, VL, WH and WL.

The power module 52 switches ON (connection)/OFF (disconnection) of the transistor pair of each phase on the basis of a gate signal that is a switching command input to gates of the transistors UH, VH, WH, UL, VL and WL from the gate drive unit 58. The power module 52 applies U phase current, V phase current and W phase current, which are alternating current, to the 3-phase stator winding by converting the direct current electric power input from the battery 51 into the 3-phase alternating current electric power and sequentially allowing conduction to the 3-phase stator winding of the motor 11. The power module 52 may convert the 3-phase alternating current electric power output from the 3-phase stator winding of the motor 11 into direct current electric power by ON (connection) driving or OFF (disconnection) driving of the transistor pair of each phase synchronized with rotation of the motor 11.

The capacitor unit 53 includes a smoothing capacitor 53a and a noise filter 53b.

The smoothing capacitor 53a is connected between the plurality of positive electrode bus bars PI and negative electrode bus bars NI of the power module 52 via the positive electrode bus bars 53p and the negative electrode bus bars 53n.

The smoothing capacitor 53a smoothes voltage fluctuation generated according to a switching operation of ON/OFF of the transistors UH, UL, VH, VL, WH and WL of the power module 52.

The noise filter 53b is connected between the plurality of positive electrode bus bars PI and negative electrode bus bars NI of the power module 52 via the positive electrode bus bars 53p and the negative electrode bus bars 53n.

The noise filter 53b includes two capacitors connected in series. A connecting point of the two capacitors is connected to a body ground or the like of the vehicle 1.

The resistor 54 is connected between the plurality of positive electrode bus bars PI and negative electrode bus bars NI of the power module 52 via the positive electrode bus bars 53p and the negative electrode bus bars 53n.

The first current sensor 55 forms the connecting point TI of each phase of the power module 52, is disposed on the input/output bus bar 59 connected to the input/output terminal Q1, and detects each current of the U phase, the V phase and the W phase. The second current sensor 56 is disposed between the resistor 54 and the direct current connector 13a, and detects an output current of the battery 51.

Each of the first current sensor 55 and the second current sensor 56 is connected to the electronic control unit 57 by a signal line.

The electronic control unit 57 controls operations of the motor 11. For example, the electronic control unit 57 is a software function section that functions when a predetermined program is executed by a processor such as a central processing unit (CPU) or the like. The software function section is an electronic control unit (ECU) including a processor such as a CPU or the like, a read only memory (ROM) in which a program is stored, a random access memory (RAM) configured to temporarily store data, and an electronic circuit such as a timer or the like. Further, at least a part of the electronic control unit 57 may be an integrated circuit such as a large scale integration (LSI) or the like. For example, the electronic control unit 57 executes feedback control or the like of the current using a current detection value of the first current sensor 55 and a current target value according to a torque command value with respect to the motor 11, and generates a control signal input to the gate drive unit 58. For example, the electronic control unit 57 may execute feedback control or the like of the current using a current detection value of the first current sensor 55 and a current target value according to a regeneration command value with respect to the motor 11, and generate a control signal input to the gate drive unit 58. The control signal is a signal showing timing when ON (connection)/OFF (disconnection) driving of the transistors UH, VH, WH, UL, VL and WL of the power module 52 is performed. For example, the control signal is a signal or the like obtained through pulse width modulation.

The gate drive unit 58 generates a gate signal for actually operating a driving ON (connection)/OFF (disconnection) of the transistors UH, VH, WH, UL, VL and WL of the power module 52 on the basis of the control signal received from the electronic control unit 57. For example, the gate drive unit 58 executes amplification, a level shift, and so on, of the control signal, and generates a gate signal.

As described above, according to the driving unit 10 of the embodiment, radiation of heat generation of the motor 11 and the inverter 31 can be promoted while minimizing heat transfer between the motor 11 and the inverter 31 using the partition member 15. Heat transfer between the motor 11 and the inverter 31 can be minimized by the pair of second heat conductive members 42 (the motor-side heat conductive member (the second heat conductive member) 42a and the inverter-side heat conductive member (the third heat conductive member) 42b) that interpose the first heat conductive member 41 in between. The motor-side heat conductive member 42a can minimize heat transfer of an ambient temperature on the side of the motor 11 having a relatively high temperature toward the inverter 31.

Further, since the first heat conductive member 41 having a thermal conductivity higher than that of the pair of second heat conductive members 42 comes into direct contact with the case 33 of the control unit 13 and is coupled thereto, radiation of heat transmitted to the first heat conductive member 41 to the case 33 is promoted. Accordingly, an increase in the ambient temperature on the side of the inverter 31 by the ambient temperature on the side of the motor 11 can be minimized.

In addition, since the motor housing 25 and the case 33 are coupled via the sealing member 35 such that they do not come into direct contact with each other, heat transfer between the motor housing 25 and the case 33 can be minimized.

In addition, since the motor-side heat conductive member 42a is formed to be thicker than the inverter-side heat conductive member 42b, heat transfer from the side of the motor 11 that has a relatively higher temperature than that of the side of the inverter 31 toward the inverter 31 can be minimized.

Hereinafter, variants of the embodiment will be described.

Figure 6:
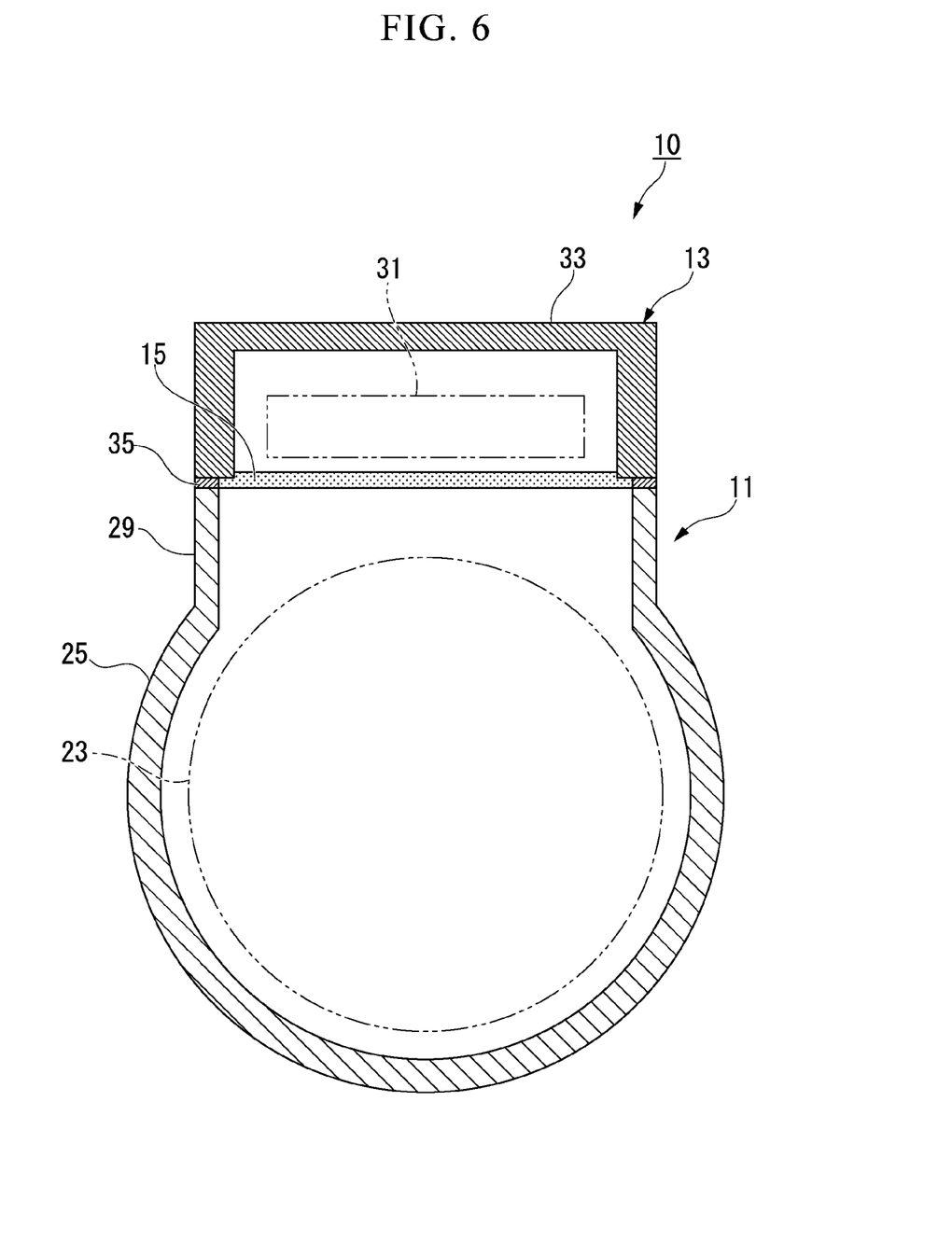
FIG. 6 is a cross-sectional view showing a configuration of a driving unit according to a first variant of the embodiment of the present invention.

FIG. 6 is a cross-sectional view showing a configuration of the driving unit 10 according to a first variant of the embodiment of the present invention. In the above-mentioned embodiment, while an external form of the partition member 15 is formed in a bathtub shape having the concave section 15a, there is no limitation thereto. An external form of the partition member 15 may be formed in another shape.

In the first variant shown in FIG. 6, an external form of the partition member 15 is formed in a flat plate shape.

In the first variant, versatility related to the shape of the partition member 15 can be improved.

Figure 7:
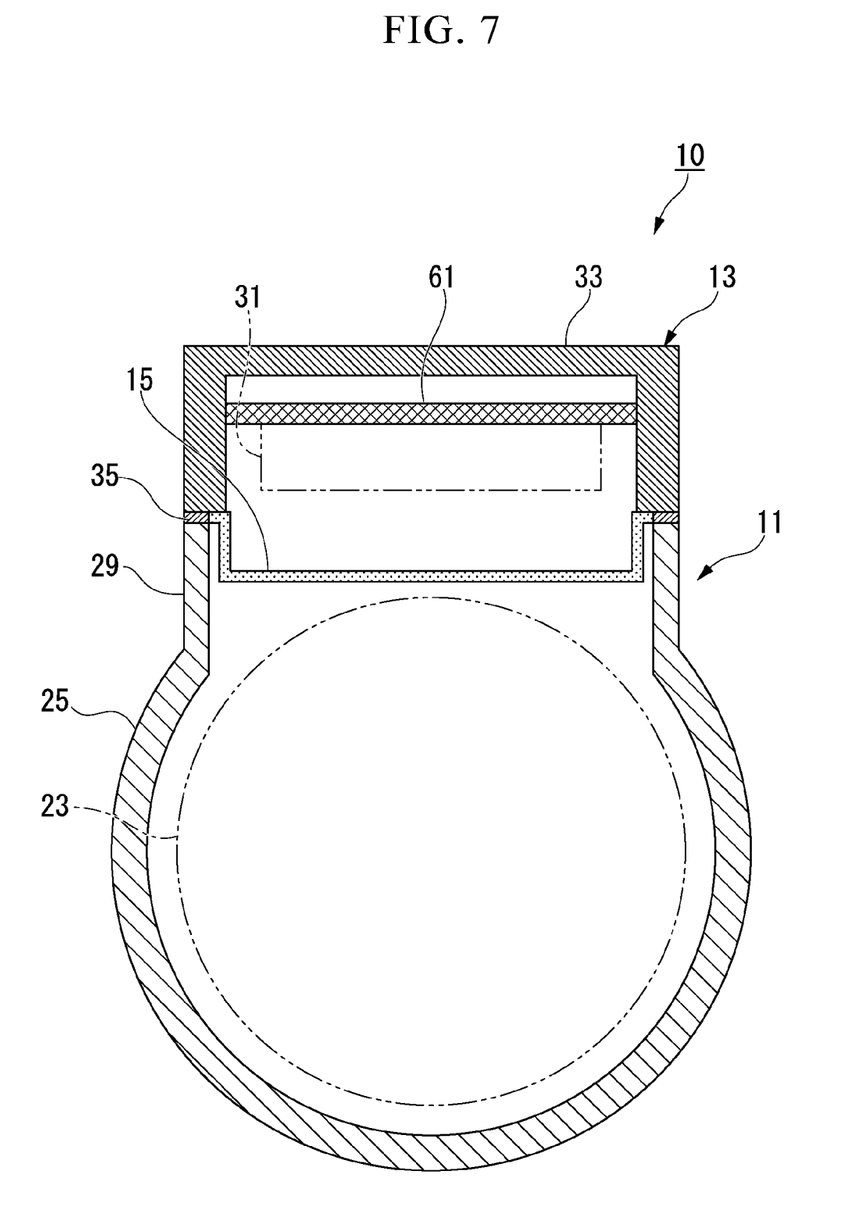
FIG. 7 is a cross-sectional view showing a configuration of a driving unit according to a second variant of the embodiment of the present invention.

FIG. 7 is a cross-sectional view showing a configuration of the driving unit 10 according to a second variant of the embodiment of the present invention. Like the second variant shown in FIG. 7, in the above-mentioned embodiment, the control unit 13 may include a cooling member 61 on which the inverter 31 is mounted. The cooling member 61 is, for example, a heat sink, a water jacket, and so on.

According to the second variant, radiation of heat transferred to the first heat conductive member 41 can be promoted.

Figure 8:
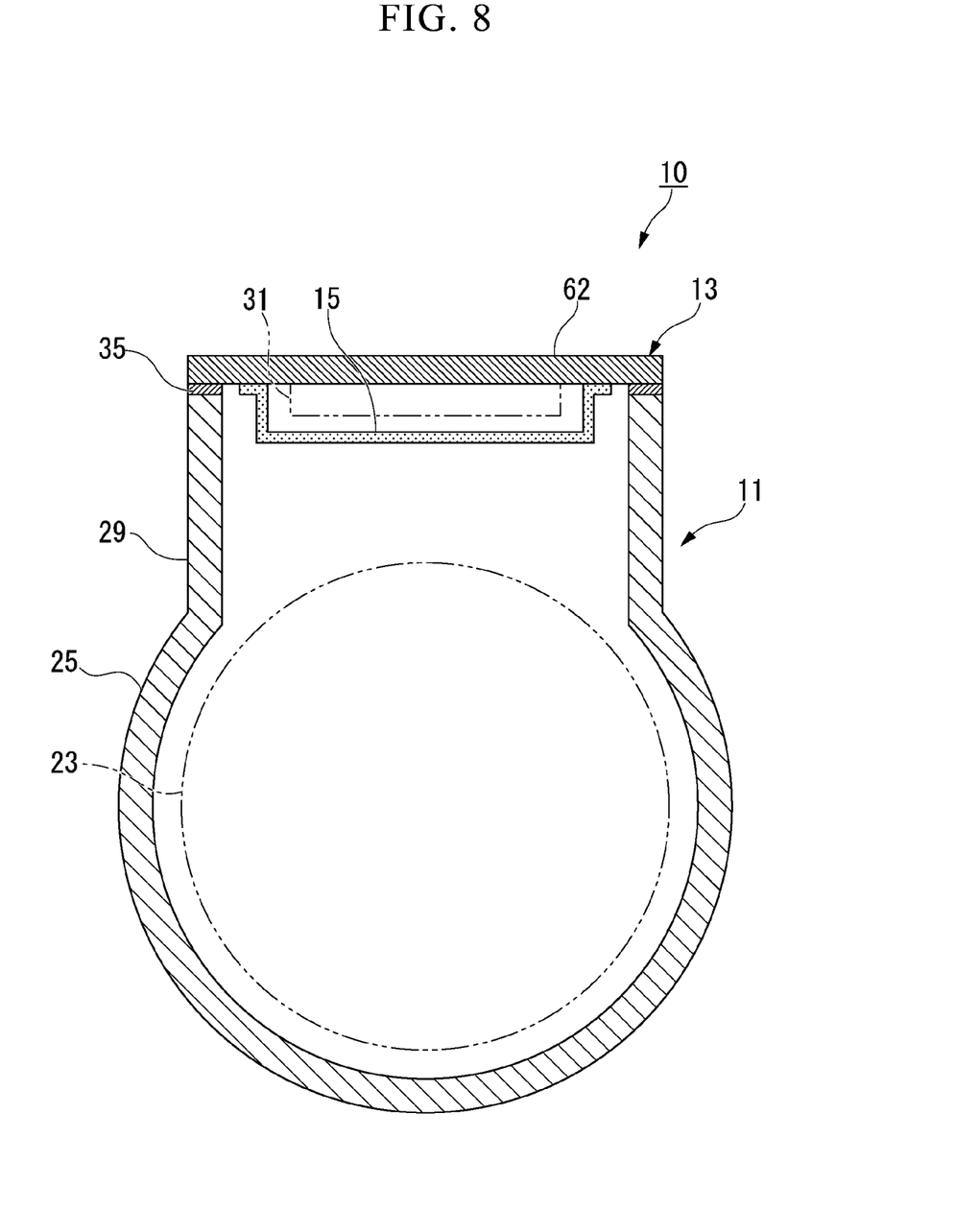
FIG. 8 is a cross-sectional view showing a configuration of a driving unit according to a third variant of the embodiment of the present invention.

FIG. 8 is a cross-sectional view showing a configuration of the driving unit 10 according to a third variant of the embodiment of the present invention. In the above-mentioned embodiment, the partition member 15 may constitute a cover of the inverter 31. In the third variant shown in FIG. 8, the control unit 13 includes a plate-shaped housing 62 instead of the case 33 having the box shape. The partition member 15 is coupled to the housing 62 to cover the inverter 31.

According to the third variant, mixing of foreign substances such as oil or the like from the motor 11 side toward the inverter 31 can be minimized.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A driving unit comprising:
   a motor;
   an inverter configured to transfer electric power to and/or from the motor;
   a casing configured to accommodate the motor and the inverter; and
   a partition member disposed between the motor and the inverter,
   wherein the partition member comprises a first heat conductive member, a second heat conductive member disposed at a first side of the first heat conductive member in a thickness direction of the first heat conductive member and having a thermal conductivity lower than that of the first heat conductive member, and a third heat conductive member disposed at a second side of the first heat conductive member in the thickness direction of the first heat conductive member and having a thermal conductivity lower than that of the first heat conductive member, and
   the first heat conductive member is coupled to at least one of a part of the casing closer to the accommodated inverter compared to the motor and a heat sink, wherein the first heat conductive member does not expose from the second heat conductive member on the side of a motor housing and does not come in direct contact with the motor housing.

2. The driving unit according to claim 1,
   wherein a part of the first heat conductive member is exposed from the second heat conductive member, and comes in contact with at least one of the part of the casing closer to the accommodated inverter and the heat sink.

3. The driving unit according to claim 1, wherein a part of the casing closer to the accommodated motor and the part of the casing closer to the accommodated inverter are coupled via a sealing member having a thermal conductivity lower than that of the casing.

4. The driving unit according to claim 1, wherein the partition member constitutes a cover of the inverter.

5. The driving unit according to claim 1, wherein an external form of the partition member is formed in a shape having a concave section or a flat plate shape.

6. The driving unit according to claim 1, wherein, among the second heat conductive member and the third heat conductive member, the one disposed closer to the motor has a larger thickness.

\* \* \* \* \*